United States Patent

Pauliukonis

[15] 3,703,125
[45] Nov. 21, 1972

[54] PLASTIC ACTUATING CYLINDER

[72] Inventor: Richard S. Pauliukonis, 6660 Greenbriar Drive, Cleveland, Ohio 44130

[22] Filed: Aug. 5, 1971

[21] Appl. No.: 169,532

Related U.S. Application Data

[63] Continuation of Ser. No. 883,152, Dec. 8, 1969, abandoned.

[52] U.S. Cl. ..................92/85, 92/163, 92/170, 92/249
[51] Int. Cl. ........F01b 11/02, F01b 31/00, F16j 1/00
[58] Field of Search..........92/85, 163, 164, 165, 170, 92/248, 249

[56] References Cited

UNITED STATES PATENTS

| | | |
|---|---|---|
| 1,718,474 | 6/1929 | McQuaid....................92/243 |
| 2,890,917 | 6/1959 | Prince.....................92/164 X |
| 2,984,529 | 5/1961 | Dailey.......................92/85 X |
| 3,040,712 | 6/1962 | Harrah....................92/248 X |
| 3,059,586 | 10/1962 | Brailsford..................92/170 |
| 3,159,086 | 12/1964 | Schwartz................92/170 X |

*Primary Examiner*—Martin P. Schwadron
*Assistant Examiner*—Irwin C. Cohen
*Attorney*—Harold F. McNenny et al.

[57] ABSTRACT

An all-plastic piston and cylinder assembly including an integrally molded end closure having a coaxial port therein and a threaded all-plastic closure member having a single annular groove and seal for the piston rod.

3 Claims, 4 Drawing Figures

PATENTED NOV 21 1972 3,703,125

INVENTOR.

BY RICHARD S. PAULIUKONIS

PLASTIC ACTUATING CYLINDER

This is a continuation of my copending application, Ser. No. 883,152, filed Dec. 8, 1969, and now abandoned.

The present invention pertains to the fluid power equipment and more specifically to an actuating cylinder energized either hydraulically or pneumatically in a given power system that employs either a single-acting or a double-acting cylinder. Such cylinders are normally made up of metallic cylindrical bodies within which are located all-metal piston rod assemblies and metallic cylinder end caps, including appropriate elastomer seals. The all-metal piston rod assembly normally consists of a piston to which an actuating rod is secured permanently either by welding, soldering or simply bolting together, the latter requiring special parts such as extra seals and nuts. The above described cylinder manufacturing technique representing the present state of art is time consuming, complicated and costly.

The present invention provides a cylinder which is mass produced utilizing process equipment and techniques known to reduce manufacturing costs. It is obviously desirable to provide cylinders of this type which are inexpensive and perform equally well in service. It is also desirable that in the manufacture of such cylinders the applicability of available plastic or synthetic rubber compounds be thoroughly explored.

The present invention provides cylinders of this general type which are simple in design, and hence low in cost, and reliable in operation. One aspect of the invention makes possible the utilization of injection and pressure molding with thermosetting or thermoplastic materials or a combination thereof in cylinder fabrication. It provides means of integrally molding at least one end cap with the cylinder body in one operation. It also enables fabrication of an all-plastic one-piece piston rod assembly drastically cutting down the manufacturing cost of such piston assembly. In another embodiment, the piston rod assembly may be of plastic-rubber molded composite construction or of a metal-plastic-rubber molded composition produced at a fraction of the cost the present techniques entail. There are many plastics, plastic-rubber composites including synthetic rubbers with material properties that will fit the requirements of a specific application. The following property characteristics considered mandatory in selection of materials: self-lubricity, resistance to heat, abrasion and wear, dimensional and chemical stability, low water absorption, creep resistance and resiliency, including high impact strength and fatigue endurance.

The materials that offer the compound formulations which most closely satisfy the described property conditions and, at the same time, entail sufficient property difference to meet a variety of applicational requirements of the finished parts are quite numerous. Their list includes the following more common plastic and synthetic rubber contenders: Alkyds, Chlorinated polyether and polyvinal chloride, Polycarbonate-glass fiber reinforced, Flurocarbons, Epoxies, Melamines, Nylons, Phenolics, PVC-acrylic, Acrylic-plastic, Acetal copolymer, Diallyl Phthalate-orlon filled, Allyl Diglycol carbonate, Rubber phenolics, Hard rubber, Nitrille rubber, Polystyrene-rubber modified, Fluorocarbon rubber (Viton), Chloroprene, Polyacrylic, Polyurethane, Silicone, Teflon, or the combination of the above materials. Depending on the magnitude of the actuating pressures, the required forces, the number of cycles, the environmental conditions, including other parameters that may influence the selection of such cylinders, the ultimate choice of the compound can always be based on the minimum fabricating cost for a given cylinder design.

These and other objects and advantages of the invention will become more fully apparent from the following description of an embodiment of the invention, taken together with the accompanying drawings.

Figure 3:
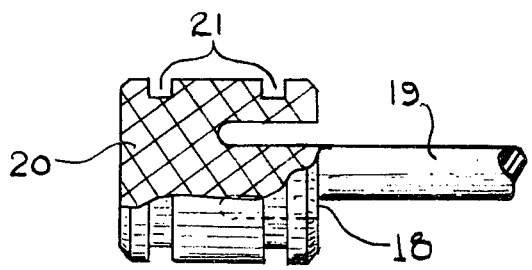
Figure 4:
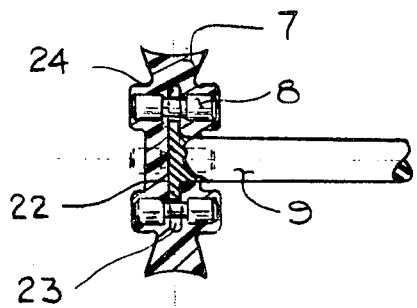

FIG. 3 identifies an all-plastic piston rod assembly in which the piston configuration is modified for service in moderate pressures;

FIG. 4 illustrates the details of a composite piston rod assembly designated for high pressure duty.

Figure 1:
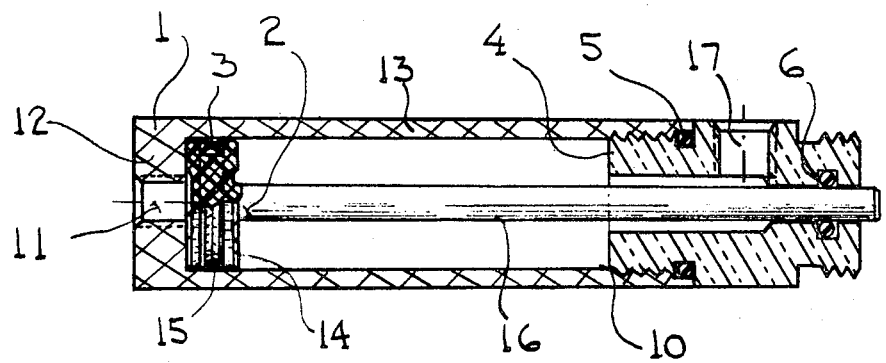
FIG. 1 is a cross sectional view of a typical cylinder assembly serving low pressures of operation.

Shown in FIG. 1 is an all-plastic one-piece molded cylinder housing 1, having a tubular body 13 with open receiver end 10 and closed opposite end with integrally molded end cap 12. In the cylinder end cap 12 a port 11 is provided for the supply of working fluid. An all-plastic one-piece molded piston and rod assembly 2 is comprised of piston 14 including appropriate grooves 15 for elastomer seal 3 of O-ring or other suitable configuration, and piston rod 16. With the cylinder receiver end 10 open, the piston rod assembly 2 is slidably inserted into cylinder 1. Rod end 4 provided with elastomer seals 5 and 6 is slipped over piston rod 16 for subsequent securing permanently in the receiver end 10 of housing 1. The assembly of the cylinder is thereby completed. An appropriate fluid flow port 17 is provided in the rod end 4. With ports 11 and 17 connected to the working fluid supply lines, the cylinder becomes a double-acting device which either extends or retracts, depending upon the direction of the working fluid flow. Thus, the operation of the cylinder is insured.

Figure 2:
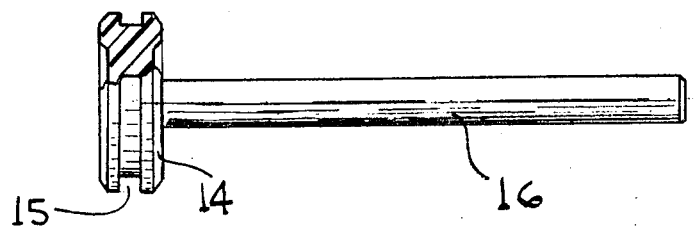
FIG. 2 shows separately an all-plastic piston rod assembly for low pressure duty, identical to that illustrated in FIG. 1, identifying structural details.

The piston assembly described above is limited to line working pressure which if not exceeds 100 psi is considered low. For higher or moderate pressures and larger end forces, the design of the piston rod assembly 2 of FIGS. 1 and 2 must be replaced by the piston rod assembly identified in FIG. 3. FIG. 3 shows an all-plastic one-piece molded piston rod assembly 18 with integral piston rod 19 and a double-grooved piston 20. Elastomer seals are fitted (not shown) over grooves 21 before the final assembly into the cylinder housing which may be similar to housing 1 of FIG. 1.

For high operating pressures, in particular cases in which cushioning is preferred, the design of a composite piston rod assembly illustrated in FIG. 4 should be considered. FIG. 4 shows piston rod assembly 7 which comprises piston rod 9 terminating with flare 22, said flare provided with radial slots 23 including impact-absorbing pegs 8, and rubber piston 24 molded into a one-piece composite assembly. The piston rod assembly of FIG. 4 does not require any elastomer seals and could be placed into cylinder housing similar to housing 1 of FIG 1.

Although a preferred embodiment of this invention is disclosed, it is to be understood that various modifications and rearrangements of parts may be resorted to without departing from the scope of the invention disclosed and claimed herein.

What is claimed is:

1. An actuator cylinder comprising an all-plastic one-piece molded cylinder housing having a cylinder bore extending lengthwise thereof from one end which is open, thread means formed in said cylinder housing adjacent to said open end of said bore, said housing being formed with an integrally molded end closure closing the other end of said bore, a first fluid supply port extending completely through said end closure communicating with said other end of said bore and coaxial therewith, an all-plastic one-piece closure member, thread means on said closure member for removably securing said closure member on said cylinder housing at said one end of said bore, an all-plastic one-piece piston having a piston head closely fitting and axially movable along said bore, said piston providing an integrally molded piston rod extending from said piston head through said closure member, said closure member providing an inner end wall extending inwardly from said housing toward the axis of said bore to a first axially extending passage, said first axially extending passage being coaxial with said bore and extending around said piston rod with substantial annular clearance, said closure member also being provided with a second passage extending from said first passage through which said piston rod extends with a close fit, said closure member being provided with a single annular groove intermediate the ends of said second passage, a single seal in said annular groove preventing leakage of fluid along said second passage while permitting axial movement of said piston rod through said closure member, a second fluid port in said closure member open to said first passage and communicating therethrough with said one end of said bore, said piston rod extending from said piston head a sufficient distance to insure that it extends into said second passage when said thread means are first engaged.

2. An actuator as set forth in claim 1 wherein said piston head is provided with a peripheral groove, and a seal is positioned in said groove.

3. An actuator cylinder comprising an all-plastic one-piece molded cylinder housing having a cylinder bore extending lengthwise thereof from one end which is open, said housing being formed with an integrally molded end closure closing the other end of said bore, a first fluid supply port in said end closure communicating with said other end of said bore, an all-plastic one-piece closure member, thread means removably securing said closure member on said cylinder housing at said one end of said bore, a piston having a piston head closely fitting and axially movable along said bore, said piston including a piston rod extending from said piston head through said closure member, said closure member providing an inner end wall extending inwardly from said housing toward the axis of said bore to a first axially extending passage, said first axially extending passage being coaxial with said bore and extending around said piston rod with substantial clearance, said closure member also being provided with a second passage extending from said first passage through which said piston rod extends with a close fit, said closure member being provided with an annular groove intermediate the ends of said second passage, a seal in said annular groove preventing leakage of fluid along said second passage while permitting axial movement of said piston rod through said closure member, a second fluid port in said closure member open to said first passage and communicating therethrough with said one end of said bore, said piston rod including a flared end integral with said piston rod, a plurality of longitudinally extending impact pegs extending through slot means in said flared end, and an elastomeric cover completely surrounding said flared end and pegs and providing a seal between said piston and cylinder bore.

* * * * *